United States Patent [19]

Harrill et al.

[11] Patent Number: 4,533,994
[45] Date of Patent: Aug. 6, 1985

[54] PRIORITY CIRCUIT FOR A MULTIPLEXER TERMINAL

[75] Inventors: Roy L. Harrill; James T. Odom, both of Huntsville, Ala.

[73] Assignee: Avco Corporation, Huntsville, Ala.

[21] Appl. No.: 530,707

[22] Filed: Sep. 9, 1983

[51] Int. Cl.³ .............................................. G06F 9/46
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,836,889 | 9/1974 | Kotok et al. | 364/200 |
| 4,034,349 | 7/1977 | Monaco et al. | 364/200 |
| 4,484,271 | 11/1984 | Miu et al. | 364/200 |

Primary Examiner—Raulfe B. Zache
Attorney, Agent, or Firm—Robert J. McNair, Jr.; Irwin P. Garfinkle

[57] ABSTRACT

A priority gating system is disclosed which is useful with a communication subsystem having a multiplicity of parallel input/output lines. To service these lines a priority address determination is made for all channels with 0 designating the highest priority and (n-1), the lowest in an n-channel system. Each signal line to the input/output devices will have a card select buffer serially inserted therein. All of the buffers will be enabled during the data transfer portion of the cycle. At the end of the service cycle for message transfer, the central processing unit initiates a dual pulse interrupt acknowledge command which first disables all buffers, then after a short delay, activates priority decoder circuitry. The priority decoder circuitry determines which of the n-channel input/output lines is to be serviced during the next data cycle. At the end of the dual pulse time interval, the logic card associated with the input/output line to be serviced as a result of the priority determination signifies to the central processor unit the memory location where pertinent data for that line is to be found.

5 Claims, 4 Drawing Figures

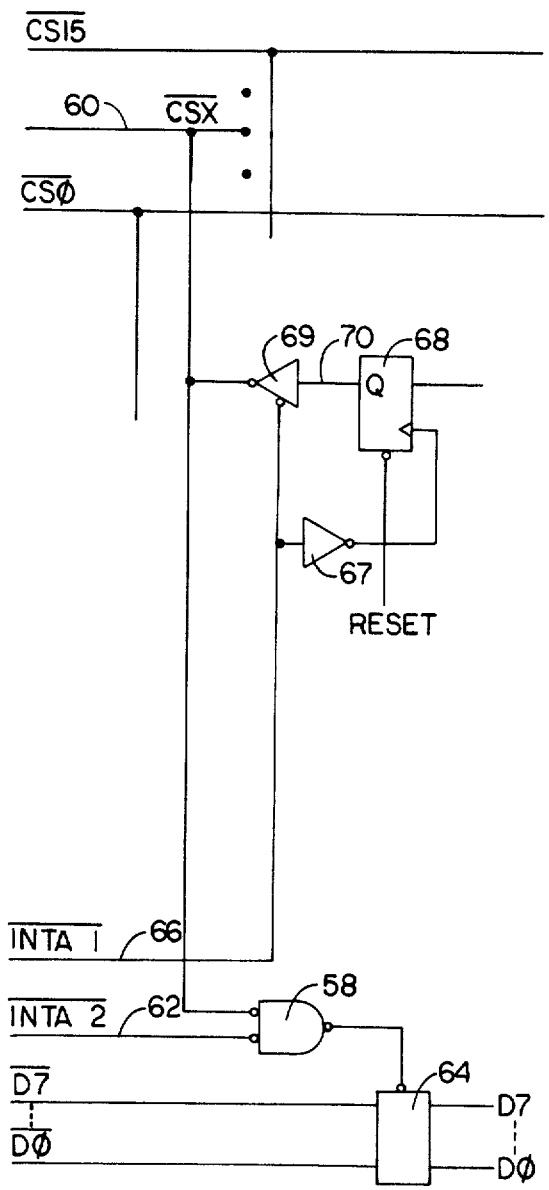
FIG. 2
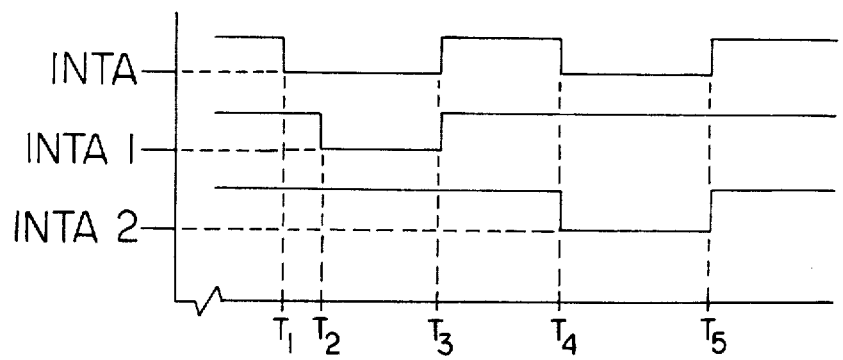
FIG. 3
| ENABLE | IN | OUT |
|--------|----|----|
| L | L | L |
| L | H | H |
| H | L | Z |
| H | H | Z |
L — LOW
H — HIGH
Z — OPEN
FIG. 4

PRIORITY CIRCUIT FOR A MULTIPLEXER TERMINAL

BACKGROUND OF THE INVENTION

This invention relates to data processing/control systems wherein a multiplicity of input/output subsystems or channel sources request central processor activity by means of interrupts and where the priority of some data is higher than others necessitating that the multiplexer provide service on prioritized bases.

The priority selecting apparatus is inserted in the input/output lines of a remote multiplexer terminal assembly capable of receiving data from external equipment, processing that data according to a software program, and transmitting data to external equipment. The assembly is capable of operating in a stand-alone configuration at the highest processing level, or it can be used at an intermediate level relying on a host computer for overall system control. The assembly will accept downloaded programs from a host computer as well as execute a stored program. The stored program is usually executed asynchronously; that is, the program executes independently of the host computer.

Many multiplexers have been designed since the introduction of microprocessors. Some of these receive and transmit channel data on a first-in-first-out basis. Others give priority to certain classes of data. U.S. Pat. No. 4,271,467 to Holtey describes one such input/output priority resolver. The apparatus includes a read only memory which establishes the order of priority. The read only memory is responsive to interrupt signals from the input/output devices in order to select the highest priority device requesting service.

U.S. Pat. No. 4,380,065 to Hirtle, et al describes a variable priority communication multiplexer which employs a polling method that prevents any one channel from "hogging" the system. A first-in-first-out (FIFO) memory is used to store the receive and transmit channel numbers of the input and output devices coupled to the multiplexer. An input or output device requesting service responds to its channel number identifier stored in the FIFO memory. The remaining channel numbers in the FIFO are recirculated to give the receive channels priority over the transmit channels. Highest priority is given to the receive channel most recently used and beyond that, equal priority to all transmit channels.

The microprocessor based multiplexer system will typically have input/output devices which request service from a central processing unit by means of interrupts. An interrupt signal will inform the central processing unit that the input/output device either has information to deliver or is in need of an output from the system. Most of the multiplexer systems will have a multiplicity of input/output devices connected in parallel. Conflicts will therefore occur when two or more of the input/output devices simultaneously request service. Since servicing some of the devices are more critical than others there is a need to structure priority into the system. That is, if a higher priority device interrupts the central processing unit at the same time as a lower priority device, the higher priority device must be serviced first. The purpose of this invention is to reduce the circuitry required to implement the interrupt and priority service requirements. We accomplish this by multiplexing the interrupt priority signals across existing address signal lines. As a result, our circuitry is appreciably simplified over the prior art approaches.

SUMMARY OF THE INVENTION

A typical input/output interrupt sequence consists of two cycles. First, any input/output device interrupts the central processing unit. The central processing unit finishes the current instruction(s) and initiates the first cycle. During the first cycle the interrupt circuitry must determine which input/output device has priority. To determine priority, all interrupt requests (the initial interrupt plus all interrupts that have occurred between the time the first interrupt occurred until the interrupt is serviced by the central processing unit) are frozen at the beginning of the cycle. The requests must be frozen to prevent errors occurring because of propagation delays in the priority circuits when a higher level interrupts during this cycle. At the end of the first cycle, the highest priority input/output interrupt is determined. The central processing unit then initiates the the second cycle of the interrupt sequence. During the second cycle, the interrupt circuitry enables the highest priority input/output (determined subsequent to the first cycle) to return its interrupt vector to the central processing unit. The interrupt vector points the central processing unit to the correct interrupt service routine to carry out the next action.

Typically, the circuitry required to implement the priority determination requires several integrated circuits and many bus signals. Bus signals are the signals "bussed" between the central processing unit and the input/output devices. For example, a system with sixteen input/output devices could require up to sixteen interrupt request bus signals and sixteen interrupt grant signals. The number of bussed signals could be reduced to four signals for request and four signals for grant if decode circuitry were added to each input/output device interface circuitry. This invention eliminates the need for any bus signals by time multiplexing the interrupt request-and-grant signals across the bussed addressed signal lines which exist on all microprocessor systems.

The input/output (I/O) subsystem will have a multiplicity of parallel input/output lines. To service these lines a priority address determination is made for all channels with 0 designating the highest priority and (n−1), the lowest in an n-channel system. Each card address selection signal line to the input/output devices will have a card select (CS) buffer serially inserted therein. All of the CS buffers will be enabled during the data transfer portion of the cycle. At the end of the service cycle for message transfer, the central processing unit (CPU) initiates an interrupt acknowledge (INTA) command which first disables all CS buffers, then after a short delay, activates priority decoder circuitry. The priority decoder circuitry determines which of the n-channel input/output lines is to be serviced during the next data cycle.

At the end of the INTA time interval, the logic card associated with the input/output (I/O) line to be serviced as a result of the priority determination returns its vector to the CPU. The term "return its vector" signifies to the CPU the memory location where pertinent data for that line is to be found. Symbolically the time interval devoted to the return-its-vector function is labeled INTA2. When the end of the INTA2 time interval arrives, the CS address buffers are again enabled to allow transfer of input/output data.

Our invention minimizes the number of signals being bussed from the CPU to the input/output cards. This results from multiplexing them across already existing address signal lines. Only two additional circuits are required, those generating interrupts and the timing circuits which eliminate bus contention on the card select lines. Together they establish priority latching. Latching is achieved by the addition of a gate to each input/output card.

BRIEF DESCRIPTION OF THE DRAWINGS

FIG. 2 is a typical input/output logic card interface which utilizes the digital information from the FIG. 1 circuitry.

FIG. 3 shows the output signal function table of one of the card select buffers.

FIG. 4 shows the time sequence of events in the FIG. 1 circuitry.

DESCRIPTION OF THE PREFERRED EMBODIMENT

Figure 1:
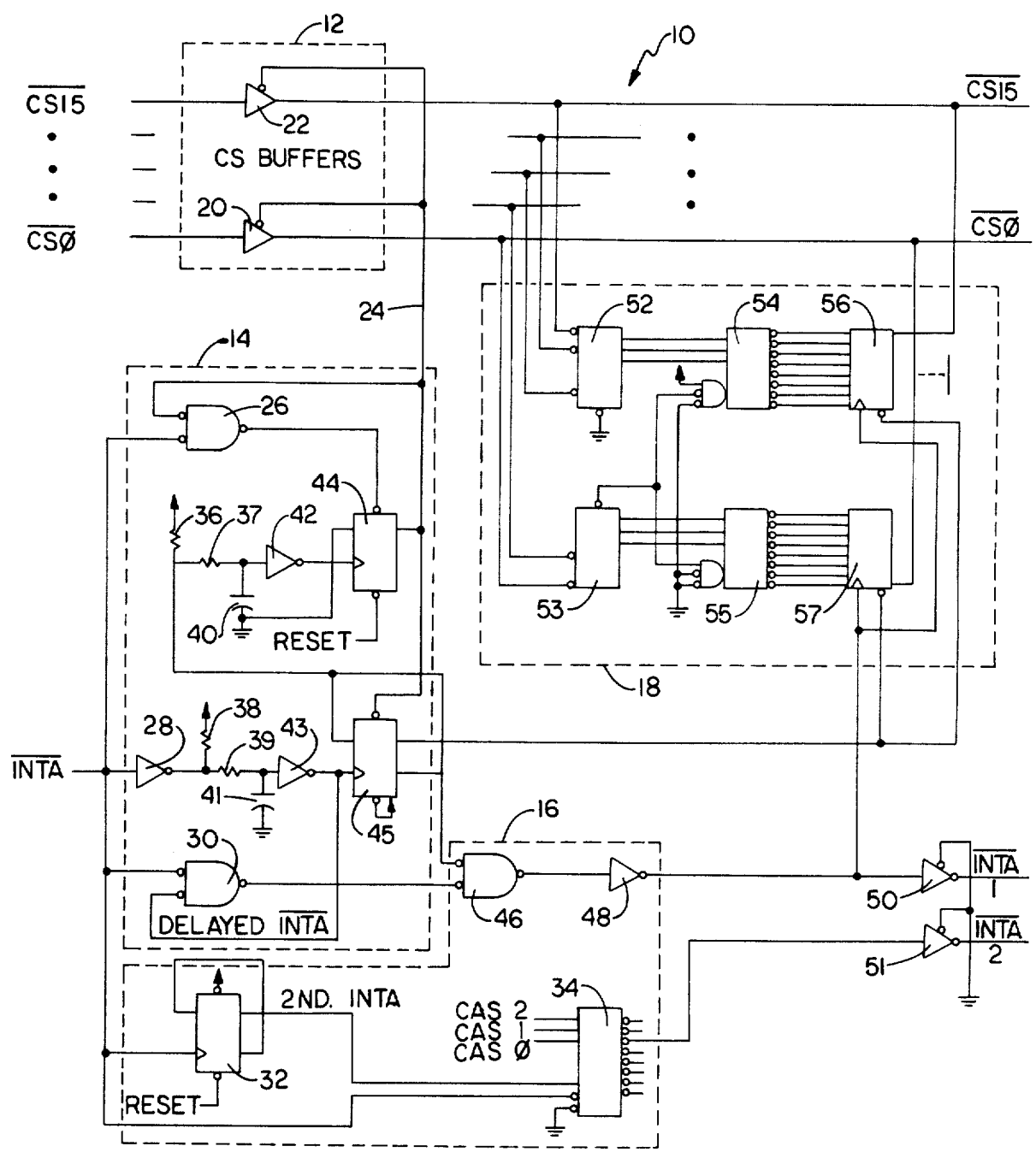
FIG. 1 is a circuit diagram of a sixteen channel priority gating system.

FIG. 1 shows a circuit diagram of a sixteen channel priority gating system 10. It will be understood that the overall data multiplexing system also includes a central processing unit (CPU), a main memory, a peripheral equipment controller and the necessary system buses for connecting all units into an operating entity. Gating system 10 is made up of four functional blocks, namely: the card select buffer section 12, the priority timing signal generator 14, the INTA2 signal generator 16 and the priority decoder 18. Specifics, regarding how each accomplishes its task will be described with reference to FIG. 1. First, it should be pointed out that the digital logic was implemented using circuitry which used negative going voltage as the desired signal to cause an action. As such, the desired input waveforms are the complement or barred signals where the low voltage value is a "true".

In the card select buffer section 12 there will be sixteen CS address buffers, one serially inserted in each signal line. Only two such buffers are shown. CS address buffer 20 controls the passage of information on the line having the highest priority, namely, CS-0. Buffer 22 controls data transfer along the line designated as having the lowest system priority, namely CS-15. It will be understood that there are also fourteen other gates, one for each priority designation CS-1 to -14. Each of the buffers was implemented using one section of an SN74LS244. The enable gates of all buffers were connected in parallel to line 24. The card select (CS) address bus signals pass through section 12. For normal operations these buffers simply pass the CS signals to each I/O card, selecting the appropriate one. Note there are 16 CS signals, one for each I/O card. During an interrupt cycle, these buffers are turned off with a high signal to the enable input. In the OFF state the buffers are high impedence outputs, blocking the CS signals from passing through the buffers.

The buffer symbol represents a non-inverting tri-state gate. When the enable input is low, the input is passed to the output. When the enable is high, the output is open as shown in the function table of FIG. 3.

The circuitry within the priority timing signal generator 14 ensures that the CS buffers are not enabled at the same time that the priority circuits are active. This priority determination period is initiated when the CPU sends an interrupt acknowledge ($\overline{INTA}$) to the timing signal generator 14. The $\overline{INTA}$ signal from the CPU inputs in parallel to negative logic and-gates 26 and 30, Schmitt trigger 28, flip flop 32 and decoder 34, the two last named components being in the INTA2 signal generator 16. Additional elements within timing signal generator 14 include resistors 36, 37, 38 and 39, capacitors 40 and 41, Schmitt triggers 42 and 43, and flip flops 44 and 45. The Schmitt triggers 28, 42 and 43 may typically be type SN74LS14. Resistors 36 and 38 typically are valued at 4700 ohms. Resistors 37 and 39 typically are valued at 3300 ohms while capacitors 40 and 41 are valued at 330 picofarads. In the unit reduced to practice the flip flops 32, 44 and 45 were all type SN74LS74 and the negative logic and-gates 26 and 30 were both type SN74LS32.

In combination the elements within timing signal generator 14 accomplish two things. First, on receipt of a negative going pulse from the CPU, the card select (CS) buffers are disabled via line 24. This ensures that the CS buffers are not "ON" at the same time that the priority circuits are establishing who is to be serviced next. Second, the circuit elements within block 14 together with the aid of negative logic and-gate 46 and Schmitt trigger 48 generate the INTA1 pulse. The leading edge of INTA1 latches the local interrupt request on each I/O card. The time relationship of these signal waveforms is shown in FIG. 4.

As seen in FIG. 4, the CPU generates two negative going pulses during an interrupt service. One pulse lasts from $T_1$ to $T_3$. The second begins at $T_4$ and ends at $T_5$. The start of INTA1 is delayed until $T_2$ due to the RC delay networks in the timing signal generator 14. However, because of and-gate 30 the INTA1 pulse terminates at $T_3$, the same as $\overline{INTA}$.

During the second pulse from the CPU, namely $T_4$ to $T_5$, the circuit elements within block 16 generate INTA2. The 3 to 8 decoder 34 (A type SN74LS138 in the system reduced to practice) decodes the code address select signals CAS 0,-1 & 2. Depending on the binary value of the three CAS signals the decoder output can be any one of eight possibilities. The CAS signals' binary value represents the interrupt level that has the highest priority. There are eight possibilities (level 0 to 7). This circuit is set to any level, depending on system requirements. During the second $\overline{INTA}$ pulse, these lines are valid and decoded. If the circuits interrupt level is the highest level in the system at the time, then the INTA2 signal is sent to the I/O cards. (See FIG. 2).

As shown in FIG. 4, the time interval associated with the negative going portion of the INTA2 pulse lasts from $T_4$ to $T_5$. It will be understood that TTL circuits 50 and 51 represent only a portion of the quadruple bus transceivers SN74LS240 inserted in the output lines of decoder 34.

The output of timing signal generator 14 activates priority decoder 18 to select the next I/O device to be serviced. Priority decoder 18 makes this selection during time interval $T_2$ to $T_3$. The priority decoder includes a pair of 8-to-3 encoders 52 and 53. Each of the ICs accepts eight inputs and generates a 3-bit binary code representing which input line was a low voltage according to a fixed priority scheme. For example, if two or more lines are low (i.e. 6 and 2) the IC will output a binary value for the input line assigned the highest priority. It will be understood that whereas the FIG. 1 depiction shows only five input lines into encoders 52 and 53, there are in the actual system a total of sixteen, one for each CS line. In the system reduced to practice SN74LS148 encoders were used.

The binary outputs from encoders 52 and 53 were inputted into 3-to-8 decoders 54 and 55, respectively. Wired as shown, the two decoders form a 4-to-16 decode. As implemented decoders 54 and 55 were SN74LS138 chips. The third part of priority decoder 18 consists of two 8-bit latches 56 and 57. At the end of the INTA1 pulse, the information from the decoders is latched into the buffers (the information represents which device has the highest priority of the devices requesting an interrupt service). From the end of INTA1 until the end of INTA2, the latch outputs (which are tri-state type outputs) are enabled, sending the priority information to all I/O cards across the CS signals paths. The one I/O with the highest priority will be LOW, all others HIGH, LOW being the voltage which enables the line having priority. In the system reduced to practice, latches 56 and 57 were type SN74LS373. Each of the latches 56 and 57 has eight output terminals (FIG. 1 shows only the connections for the highest and lowest priority signal lines).

The latched output (The line going LOW) will be gated into an I/O card such as shown in FIG. 2. The FIG. 2 circuitry will be duplicated sixteen times, one I/O card for each signal line. Assume that card-X has the highest priority at a given time. Card select line 60 will receive a LOW from latch 56 or 57. As shown in FIGS. 1 and 4, the INTA2 signal goes LOW during the second INTA pulse. With a LOW state on both lines 60 and 62, gate 58 will AND to generate a LOW enable to the 8-bit tri-state latch 64. With latch 64 enabled, I/O card-X returns its vector on data lines $D_0 \ldots D_7$ during the INTA2 time interval thereby specifying the computer memory location needed for servicing during the next data interval. In the unit reduced to practice gate 58 was a type SN74LS32 and latch 64 was a type SN74LS373.

Within each of the FIG. 2 I/O cards are circuit elements which respond to the INTA1 signal entering on line 66. When the INTA1 pulse goes LOW (See FIG. 4), flip flop 68 is clocked, storing the interrupt request on the Q output (Line 70). Tri-state buffer 69 is enabled when INTA1 is low, thereby passing the interrupt request back along the CS signal path to the priority encoder 52 or 53, whichever line card-X is associated with. Trigger 67 is needed to establish proper polarity for the clock input of flip flop 68. In the unit reduced to practice trigger 67 was a type SN74LS04, flip flop 68 was a type SN74LS74 and buffer 69 was a type SN74LS240.

At the end of the second INTA LOW pulse from the CPU, the request grant signals from the priority latches 56 and 57 are removed from the CS lines. The CS address buffers 12 are then enabled after a short further delay determined by RC delay network 36, 37 and 40. This delay precludes erroneous signals on the busses.

By multiplexing the priority determining information across existing address signal lines we have eliminated many of the signals which the prior art systems require to be bussed from the CPU to the I/O cards. Using our approach, timing circuits eliminate bus contention both on the CS lines and at the priority latch. Addition of a single gate on each I/O card makes this possible. Implementation using the designated components was accomplished in conjunction with an Intel 8086 microprocessor.

Thus, there has been described, in accordance with the invention, a priority selecting apparatus which fully meets the objects and advantages outlined above. It is recognized that others will be able to make minor changes without departing from the invention. For example, the system could be configured to operate on positive going pulse logic, namely INTA instead of INTA. Accordingly, it is intended to embrace all such minor variations that fall within the scope of the following claims.

We claim:

1. Priority selecting apparatus for a data multiplexer terminal having in combination a multiplicity of input/output devices each including a logic card connected by a signal line to the multiplexer terminal, a central processor unit capable of generating dual pulse interrupt acknowledge commands at the end of each service cycle, a main memory for storage of data and system busses for connecting all units into an operating whole, wherein the interrupt request and grant signals are time multiplexed across the bussed address signal lines, said priority selecting apparatus comprising:

a card select buffer section, one such buffer serially inserted in each of said signal lines, each buffer being a two state device, in one state enabling passage of data bytes from the input to the output, in its second state blocking transfer of data bytes from the input to the output;

a priority decoder for selecting during each interrupt the binary value of the input/output line having the highest priority of all devices requesting service, said priority decoder being encircuited at the output end of said card select buffers;

signal generator means responsive to the dual pulse interrupt acknowledge command from the central processor unit, said generator producing output signals which maintain all buffers in a disabled state for the duration of the entire interrupt command, then after disabling the buffers activating the priority decoder signalling said decoder to determine which input/output line is to be serviced during the next data cycle, said generator further producing during the second part of said dual pulse interrupt command time interval, an enabling latch signal for the logic card associated with the highest priority line determination, said signal generator returning to a neutral status at the end of said dual pulse interrupt acknowledge command, thereby re-enabling said card select buffers; and circuit means within each logic card for signifying to the central processor unit the memory location where pertinent data is to be found for servicing the input/output line determined to have highest priority.

2. The invention as defined in claim 1 wherein said signal generator includes delay networks which allow all card select buffers to be disabled before said priority decoder makes a service request determination.

3. The invention as defined in claim 1 wherein the priority selecting apparatus is configured for sixteen address signal lines.

4. The invention as defined in claim 1 wherein the signal generator means is responsive to interrupt waveforms having the low voltage value as a "true".

5. The invention as defined in claim 1 wherein the priority selecting apparatus is compatible with a microprocessor system.

* * * * *